(12) United States Patent
Pennell

(10) Patent No.: US 6,598,181 B1
(45) Date of Patent: Jul. 22, 2003

(54) METHOD AND SYSTEM FOR DEBUGGING MULTIPLE FUNCTION CALLS

(75) Inventor: Andrew M. Pennell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 528 days.

(21) Appl. No.: 09/613,319

(22) Filed: Jul. 11, 2000

(51) Int. Cl.$^7$ ................................................ G06F 11/30
(52) U.S. Cl. ........................ 714/38; 717/129; 717/131; 717/133
(58) Field of Search ............................ 714/38; 717/124, 717/125, 127, 129, 128, 131, 132, 133

(56) References Cited

U.S. PATENT DOCUMENTS

| | | | | |
|---|---|---|---|---|
| 5,093,914 A | * | 3/1992 | Coplien et al. | 717/129 |
| 6,216,237 B1 | * | 4/2001 | Klemm et al. | 714/38 |
| 6,249,907 B1 | * | 6/2001 | Carter et al. | 717/129 |

\* cited by examiner

*Primary Examiner*—Scott Baderman
(74) *Attorney, Agent, or Firm*—Merchant & Gould P.C.

(57) ABSTRACT

A method of debugging multiple function calls in a block of program code includes examining a line of code within the block of program code; detecting if the line of code is a call instruction; and if the line of code is a call instruction, setting a first variable equal to a destination of the call instruction; setting a second variable equal to a name derived from the first variable; and adding the first and second variable to a function list. The method also includes presenting the function list to a user. A system for debugging multiple function calls in a block of program code includes an analyze module, a call module, a first address module, a name module, a record module, and a choice module. The analyze module examines a line of code within the block of program code. The call module detects if the line of code is a call instruction. The first address module sets a first variable equal to a destination of the call instruction. A name module sets a second variable equal to a name derived from the first variable. The record module adds the first and second variables to a function list. The choice module presents the function list to a user.

32 Claims, 4 Drawing Sheets

METHOD AND SYSTEM FOR DEBUGGING MULTIPLE FUNCTION CALLS

TECHNICAL FIELD

The present invention relates to debugging program code and more particularly to debugging multiple function calls.

BACKGROUND

Computer programs must be debugged prior to become error free in execution. Debugging involves searching the program code, or disassembly code, for errors. In some instances, a user that is debugging program code scans the program code for function calls, typically, because in many instances errors in the program code involve the function calls. Scanning the program code for function calls can be time consuming. This is primarily because function calls jump around and nest throughout the program code, making it difficult to track the flow of the program code.

During debugging, the user typically has to step into all of the functions rather than just the function the user is interested in. For example, if a function includes > total (get first value, get second value)

the user must first step into the get first value function and step out. Then, the user must step into the get second value function and step out. Finally, the user can step into the total portion of the function. This methodology has disadvantages. The user cannot go directly to the function he is concerned with without first parsing the other functions. Second, tracking the functions becomes difficult.

SUMMARY

In one aspect of the present invention, a method of debugging multiple function calls in a block of program code is provided. The method includes examining a line of code within the block of program code; detecting if the line of code is a call instruction; and if the line of code is a call instruction, setting a first variable equal to a destination of the call instruction; setting a second variable equal to a name derived from the first variable; and adding the first and second variable to a function list. The method also includes presenting the function list to a user.

In another aspect of the present invention, a computer program product readable by a computing system and encoding instructions for a computer process for debugging multiple function calls in a block of program code is provided. The computer process comprises instructions analogous to that described above.

In another aspect of the present invention, a system for debugging multiple function calls in a block of program code is provided. The system includes an analyze module, a call module, a first address module, a name module, a record module, and a choice module. The analyze module examines a line of code within the block of program code. The call module detects if the line of code is a call instruction. The first address module sets a first variable equal to a destination of the call instruction. A name module sets a second variable equal to a name derived from the first variable. The record module adds the first and second variables to a function list. The choice module presents the function list to a user.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its scope may be obtained from the accompanying drawings, that are briefly described below, from the following detailed descriptions of presently preferred embodiments of the invention and from the appended claims.

BRIEF DESCRIPTION OF THE DRAWINGS

Referring now to the drawings in which like reference numbers represent corresponding parts throughout.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

In general, the present disclosure describes methods and systems for debugging program code. The code, that the compiler generates for a given source line or range of source lines, is analyzed. Using code inspection techniques, the present methodology determines where function calls are made within the program code. When a function call is found, the address and name of the function is recorded as well as any jumps to addresses outside of the code block. The names of the functions are then presented to the user, and the user can select which function he wishes to step into.

Figure 1:
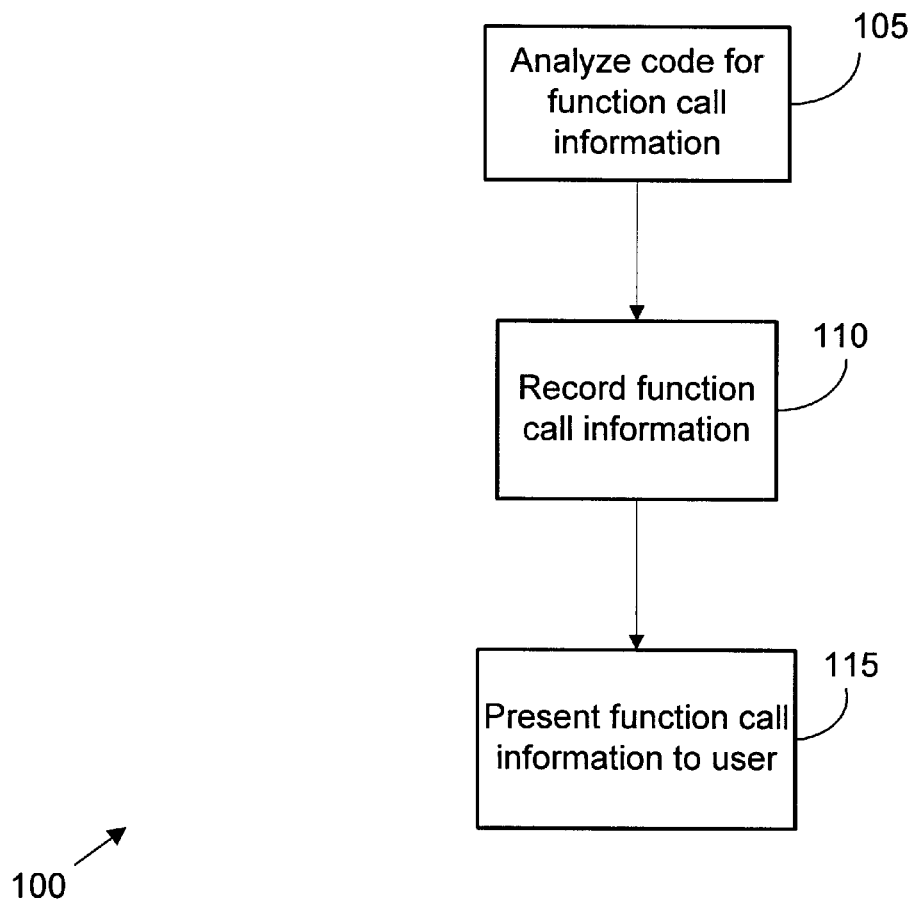
FIG. 1 is a schematic representation of methods and systems for debugging multiple function calls, according to an example embodiment of the present invention.

Referring now to FIG. 1, a schematic representation of a debugging model 100 is illustrated. Typically, a computer programmer generates source code for a given computer program. The source code is compiled by a compiler into compiled code. An analyze module 105 analyzes the compiled code for function call information. Function call information typically includes the name of the function call, the address of the function call, and any jumps to addresses outside of the current code block. The analyze module 105 uses code inspection techniques to search the code for function calls. Upon detecting a function call, the record module 110 records the function call information for later retrieval by a present module 115. The present module 115 presents the function call information to the user.

The following is an example function call:

> total (get first value, get second value)

The analyze module 105 detects the function calls, and the record module 110 records the function call information. The present module 115 uses the information recorded by the record module 110 to present to the user the three function calls: total, get first value, and get second value.

Figure 2:
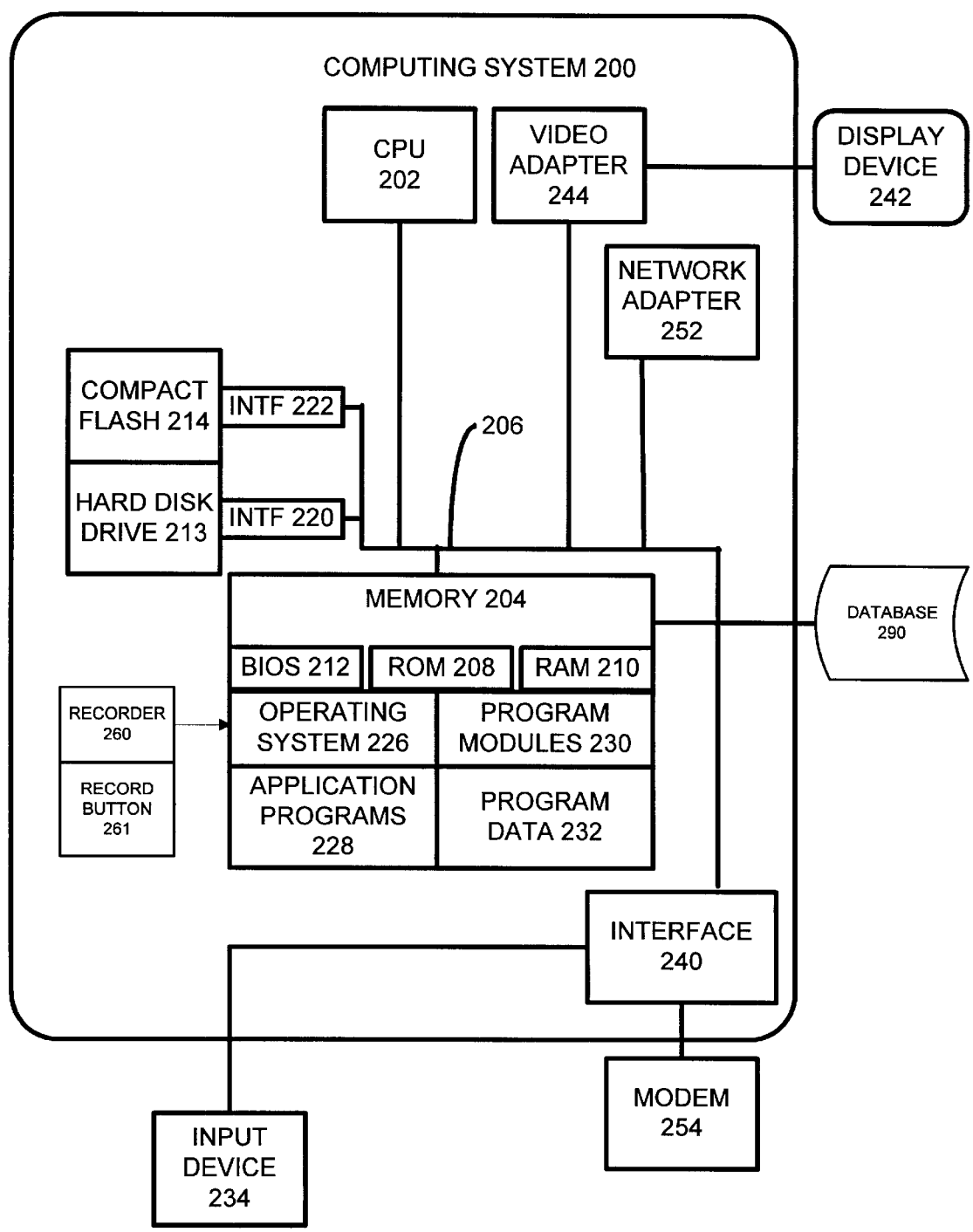
FIG. 2 is a schematic representation of a computing system that may be used to implement aspects of the present invention.

Referring now to FIG. 2, an exemplary environment for implementing embodiments of the present invention includes a general purpose computing device in the form of a computing system 200, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

Preferably, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

Preferably, the computing system 200 further includes a secondary storage device 213, such as a hard disk drive, for reading from and writing to a hard disk (not shown), and a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the exemplary environment described herein employs a hard disk drive 213 and a compact flash card 214, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the Internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the memory 204. The recorder 260 includes a microphone for receiving sound input and is in communication with the memory 204 for buffering and storing the sound input. Preferably, the recorder 260 also includes a record button 261 for activating the microphone and communicating the sound input to the memory 204.

A computing device, such as computing system 200, typically includes at least some form of computer readable media. Computer readable media can be any available media that can be accessed by computing system 200. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 200. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Computer readable media may also be referred to as computer program product.

Figure 3:
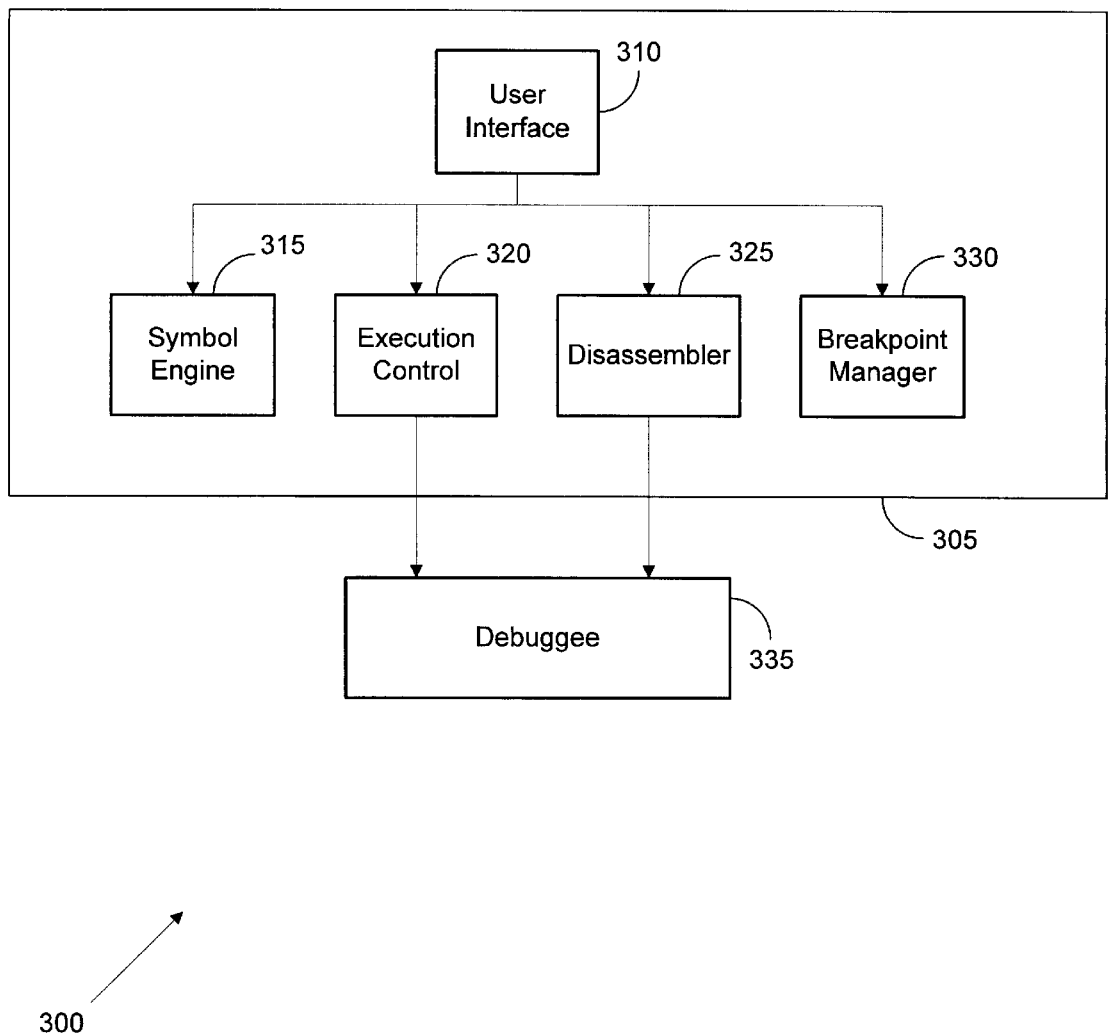
FIG. 3 is a schematic representation of a computer architecture that may be used to implement aspects of the present invention.

Referring to FIG. 3, a schematic representation of a debugger architecture 300 is illustrated. A debugger 305 includes a user interface 310, a symbol engine 315, an execution control 320, a disassembler 325, and a breakpoint manager 330. The execution control 320 and the disassembler 325 are connected to, or associated with, a debuggee 335. The debugger 305 provides information about the code, useful in debugging, to the user by examining the state of the debuggee 335. The debugger 305 helps the user detect, locate, and correct logical or syntactical errors in the program code. The debugger 305 allows the user to step through source code while the corresponding machine instructions are being executed in the debuggee 335. The debugger 305 reads and writes to the memory and registers of the debuggee 335 in such a way as to display the state of the debuggee 335 in the debugger 305 and to allow the user to modify this state.

The following is an example of a single source line and the assembly language generated from it.

| 25: | | Cfoo *p = new Cfoo ( GetValue (argc) ); |
|---|---|---|
| 004120ED | push | 4 |
| 004120EF | call | operator new (411717h) |
| 004120F4 | add | esp, 4 |
| 004120F7 | mov | dword ptr [ebp-2Ch],eax |
| 004120FA | mov | dword ptr [ebp-4],0 |
| 00412101 | cmp | dword ptr [ebp-2Ch],0 |
| 00412105 | je | main+61h(412121h) |
| 00412107 | mov | eax,dword ptr [argc] |
| 0041210A | push | eax |
| 0041210B | call | GetValue(411848h) |
| 00412110 | add | esp,4 |
| 00412113 | push | eax |
| 00412114 | mov | ecx, dword ptr [ebp-2Ch] |
| 00412117 | call | CFoo: :CFoo (411843h) |
| 0041211C | mov | dword ptr [ebp-74h],eax |
| 0041211F | jmp | main+68h(412128h) |
| 00412121 | mov | dword ptr [ebp-74h], 0 |
| 00412128 | mov | ecx,dword ptr [ebp-74h] |
| 0041212B | mov | dword ptr [ebp-20h],ecx |
| 0041212E | mov | dword,ptr [ebp-4],0FFFFFFFFh |
| 00412135 | mov | edx,dword ptr [ebp-20h] |
| 00412138 | mov | dword ptr [ebp-14h],edx |
| 26: | | |
| 27: | | return 0; |
| 0041213B | xor | eax,eax |

The above example includes a first function call at address 4120EF, a second function call at address 4120B, a third function call at address 412117, and a jump instruction at address 41211F. These function calls are identified and presented to the user for debugging as will be described below. The first function call is a call to a function named "operator new" at address 411717h. The second function call is a call to a function named "Get Value" at address 411848h. The third function call is a call to "CFoo" at address 411843h. The jump instruction is a jump out of the given block of code to a different part of the total program code. It is noted that the call and jump functions are examples, and that other processors might use different names.

In some instances, function calls are made to thunks rather than function addresses. Thunks are tiny amounts of code generated by the compiler that are used for indirect function calls, and for other purposes. In other words, thunks are intermediate links between a function call and a function created by the compiler and/or linker.

Figure 4:
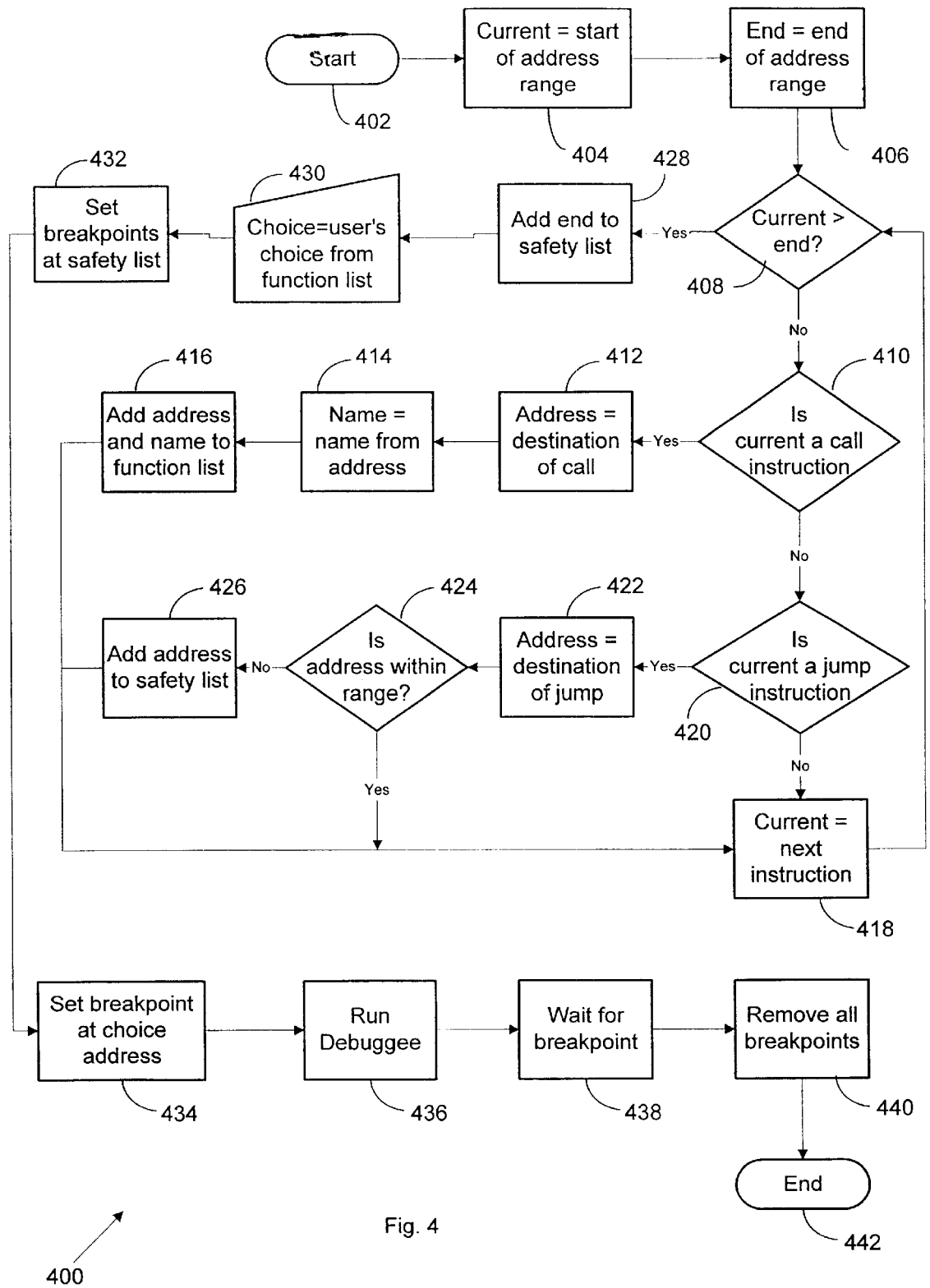
FIG. 4 is a flow chart illustrating the logical operations of the methods and systems of FIG. 1.

FIG. 4 is a flow chart representing logical operations of a debugging system 400 for debugging multiple function calls. Entrance to the operational flow of the debugging system 400 begins at a flow connection 402. A start operation 404 sets the current line of code, or current address, being examined as the start of the address range. Preferably, only a subset or block of code will be analyzed at a time rather than the entire program code. The start operation 404 sets the start of the block of code, or address range, to be analyzed. An end operation 406 sets the end of the address range to be analyzed.

A current module 408 detects whether the current line of code being examined is greater than the end of the address range, or in other words, whether the current line is out of the address range being analyzed. If the current module 408 detects that the current line is not greater than the end of the address range, operational flow branches "NO" to a call module 410. The call module 410 detects whether the current line of code being analyzed is a call instruction. If the call module 410 detects that the current line is a call instruction, operational flow branches "YES" to an address operation 412.

The address operation 412 sets a first variable, or an address variable, for the destination of the call instruction. In some instances, the address operation 412 traverses thunks to find the end destination address of the call instruction. The call instruction itself might point to a thunk that points to the function being called. The address operator 412 must traverse through the thunk, or multiple thunks, to get the actual destination address of the function.

A name operation 414 sets a second variable, or a name variable derived from the first variable. A record operation 416 records the first and second variables to a function list. A next operation 418 sets the current line of code to the next line of code to be analyzed. In other words, the next operation 418 advances the debugging system 400 to the next line of code, within the block of code being analyzed, for examination. Operational flow branches to the current module 408, and operational flow proceeds as previously described herein.

Referring to the call module 410, if the call module 410 detects that the current line of code being analyzed is not a call instruction, operational flow branches "NO" to a jump module 420. The jump module 420 detects whether the current line of code being analyzed is a jump instruction. If the jump module 420 detects that the current line of code is a jump instruction, operational flow branches "YES" to an address operation 422.

The address operation 422 sets a variable, or an address variable, for the destination of the jump instruction. A range module 424 detects whether the address variable is within the range of addresses being analyzed. If the range module 424 detects that the address variable is not within the range of addresses being analyzed, operational flow branches "NO" to a safety operation 426. The safety operation 426 adds the address variable to the safety list. The safety list sets safety or hard stops in the examination of the program code to intercept execution paths that exit from the address range being examined. Operational flow branches to the next operation 418 as previously described.

Referring back to the range module 424, if the range module 424 detects that the address variable is within the range of addresses being analyzed, operational flow branches "YES" to the next operation 418. Operational flow proceeds as previously described.

Referring back to the jump module 420, if the jump module 420 detects that the current line of code being analyzed is not a jump instruction, operational flow branches "NO" to the next operation 418. Operational flow proceeds as previously described.

Referring back to the current module 408, if the current module 408 detects that the current line of code being analyzed is beyond the range of addresses being analyzed, operational flow branches "YES" to a safety operation 428. The safety operation 428 adds the end address , or last address in the range of addresses being analyzed, to the safety list. A choice operation 430 presents a list of functions to the user, using the function list previously described. The user selects which function, from the list of functions, he is interested in debugging. A breakpoint operation 432 sets a breakpoint, or stop point, at every address in the safety list. A breakpoint operation 434 sets a breakpoint at the choice address. In other words, the breakpoint operations 432, 434 define the limits of the program code that will be examined. The safety list allows the debugging system 400 to intercept all execution paths from the address range being examined.

A debug operation 436 runs the debuggee. At hit operation 438, the debuggee stops when the debuggee hits a breakpoint previously set by the breakpoint operations 432, 434.

A remove operation 440 removes all of the safety list breakpoints and the choice address breakpoints previously set by the breakpoint operations 432, 434. In other words, the remove operation 440 clears the debugging range, so that when another call function is debugged, the debugging range can be redefined for that function. Operational flow ends at 442.

The operational flow chart depicted in FIG. 3 may best be understood in terms of application examples. Referring to FIG. 3 and the example source code described previously herein, in a first application example, the start operation 404 sets the current line of code being analyzed equal to the address 4120ED. Address 4120ED is the first address of the block of code being analyzed and the beginning of the address range to be examined. The end operation 406 sets the end variable equal to the address 41213B. Address 41213B is the last address of the block of code being analyzed and the end of the address range to be examined.

The current module 408 detects that the current line of code being analyzed is not greater than the end variable, i.e. address 4120EF is less than address 41213B, and operational flow branches "NO" to the call module 410. The call module 410 detects that the current line of code being analyzed is a call instruction, and operational flow branches "YES" to the address operation 412. The address operation 412 sets an address variable equal to address 411717h. Address 411717h is the destination address of the call function being analyzed. The name operation 414 sets a name variable from the address variable to "operator new." The record operation 416 records the address variable and name variable in a function list. The next operation 418 sets the current line equal to address 4120F4, or in other words, advances the debugging system 400 to the next line of the code to be analyzed.

The current module 408 determines that address 4120F4 is not greater than address 41213B and operational flow branches "NO" to the call module 410. The call module 410 detects that the current line of code being analyzed, i.e., address 4120F4, is not a call instruction, and operational flow branches "NO" to the jump module 420. The jump module 420 detects that the current line of code is not a jump instruction, and operational flow branches "NO" to the next operation 418. Operational flow proceeds as previously described until the debugging system 400 advances to address 41211F.

Referring to the jump module 420, the jump module 420 detects that the current line of code being analyzed, i.e., address 41211F, is a jump instruction, and operational flow branches "YES" to the address operation 422. The address operation 422 sets an address variable equal to 41218h. The range module 424 determines that the address variable is not within the range of addresses being analyzed, and operational flow branches "NO" to the safety operation 426. The safety operation 426 adds the address variable to the safety list. Operational flow branches to the next operation 418 and operational flow proceeds as previously described. If the address variable had been within the range of addresses being analyzed, operational flow would have branched "YES" to the next operation 418, bypassing the safety operation 426. Thus, if the address variable is within the range of addresses being analyzed, a safety stop is not required because the debugging system 400 will stop at the end variable defined by the end operation 406. Thus, the safety operation 426 adds additional safety stops when jump functions jump control outside of the range of addresses being analyzed.

Operational flow proceeds through the block of code as previously described until address 41214A (not shown) is reached. Referring to the current module 408, the current module 408 detects that the current address, 41214A, is greater than the end address 41213B previously set by the end operation 406. Operational flow branches "YES" to the safety operation 428. The end address 41213B is added to the safety list by the safety operation 428. The safety list now contains stop points for all of the possible branches the program code can take for the block of code being analyzed.

The choice operation 430 presents the user through a user interface, such as the user interface 310 of FIG. 3, with a list of call and jump functions, i.e. addresses 411717, 411848, 411843, and 41218. Preferably, the function list is provided to the user in a pull-down menu type list activated by the user by right clicking on a function, i.e., "operator new," "Get Value," and "CFoo::CFoo." Of course, any suitable presentation to the user can be used. The user chooses which function he wishes to debug. The function is set to the choice address. The breakpoint operation 432 sets breakpoints at the safety list addresses previously determined, and at the choice address, now selected. These breakpoints define the range of code to be debugged by the debugging system 400. The debug operation 436 runs the debuggee, such as the debuggee 335 of FIG. 3, giving the user the information he needs to debug the program code. The hit operation 438 stops the debuggee when a breakpoint is reached. The remove operation 440 removes all of the breakpoints previously set, and operational flow ends at 442. Removing all of the breakpoints previously set allows the debugging system 400 to be executed again for a different block of code or function.

The logical operations of the various embodiments illustrated herein are implemented (1) as a sequence of computer implemented steps or program modules running on a computing system and/or (2) as interconnected logic circuits or circuit modules within the computing system. The implementation is a matter of choice dependent on the performance requirements of the computing system implementing the invention. Accordingly, the logical operations making up the embodiments of the present invention described herein are referred to variously as operations, steps, engines, or modules.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of debugging multiple function calls in a block of program code, the method comprising:
   examining a line of code within the block of program code;
   detecting if the line of code is a call instruction;
   if the line of code is a call instruction:
      setting a first variable equal to a destination of the call instruction;
      setting a second variable equal to a name derived from the first variable;
      adding the first and second variables to a function list; and presenting the function list to a user.

2. A method according to claim 1, further comprising:
   if the line of code is not a call instruction:
      detecting if the line of code is a jump instruction, and if the line of code is a jump instruction, setting a third variable equal to a destination of the jump instruction.

3. A method according to claim 2, further comprising:
 detecting if the third variable is within a range of addresses being analyzed;
  if the third variable is within the range, advancing to a next line of code; and
  if the third variable is not within the range, adding the third variable to a safety list.

4. A method according to claim 3, further comprising:
 adding an end address of a range of addresses being analyzed to the safety list.

5. A method according to claim 4, further comprising:
 choosing by the user a function to be debugged from the function list; and
 setting a fourth variable equal to an address of the function chosen by the user.

6. A method according to claim 5, further comprising:
 setting a breakpoint at the fourth variable.

7. A method according to claim 6, further comprising:
 setting breakpoints at each address contained in the safety list.

8. A method according to claim 7, further comprising:
 debugging the function chosen by the user.

9. A method according to claim 8, further comprising:
 removing all breakpoints.

10. A method according to claim 2 wherein:
 setting a third variable includes setting a third variable equal to a final destination of the jump instruction by traversing at least one thunk.

11. A method according to claim 1 wherein:
 setting a first variable includes setting a first variable equal to a final destination of the call instruction by traversing at least one thunk.

12. A computer program product readable by a computing system and encoding instructions for a computer process for debugging multiple function calls in a block of program code, the computer process comprising:
 examining a line of code within the block of program code;
 detecting if the line of code is a call instruction;
  if the line of code is a call instruction:
   setting a first variable equal to a destination of the call instruction;
   setting a second variable equal to a name derived from the first variable;
   adding the first and second variables to a function list; and
   presenting the function list to a user.

13. A computer program product according to claim 12, further comprising:
 if the line of code is not a call instruction:
  detecting if the line of code is a jump instruction, and if the line of code is a jump instruction, setting a third variable equal to a destination of the jump instruction.

14. A computer program product according to claim 13, further comprising:
 detecting if the third variable is within a range of addresses being analyzed;
  if the third variable is within the range, advancing to a next line of code; and
  if the third variable is not within the range, adding the third variable to a safety list.

15. A computer program product according to claim 14, further comprising:
 adding an end address of a range of addresses being analyzed to the safety list.

16. A computer program product according to claim 15, further comprising:
 choosing by the user a function to be debugged from the function list; and
 setting a fourth variable equal to an address of the function chosen by the user.

17. A computer program product according to claim 16, further comprising:
 setting a breakpoint at the fourth variable.

18. A computer program product according to claim 17, further comprising:
 setting breakpoints at each address contained in the safety list.

19. A computer program product according to claim 18, further comprising:
 debugging the function chosen by the user.

20. A computer program product according to claim 19, further comprising:
 removing all breakpoints.

21. A computer program product according to claim 13 wherein:
 setting a third variable includes setting a third variable equal to a final destination of the jump instruction by traversing at least one thunk.

22. A computer program product according to claim 12 wherein:
 setting a first variable includes setting a first variable equal to a final destination of the call instruction by traversing at least one thunk.

23. A system for debugging multiple function calls in a block of program code, the system comprising:
 an analyze module that examines a line of code within the block of program code;
 a call module that detects if the line of code is a call instruction;
 a first address module that sets a first variable equal to a destination of the call instruction;
 a name module that sets a second variable equal to a name derived from the first variable;
 a record module that adds the first and second variables to a function list; and
 a choice module that presents the function list to a user.

24. A system according to claim 23, further comprising:
 a jump module that detects if the line of code is a jump instruction; and
 a second address module that sets a third variable equal to a destination of the jump instruction.

25. A system according to claim 24, further comprising:
 a range module that detects if the third variable is within a range of addresses being analyzed;
 a next module that advances to a next line of code, if the third variable is within the range of address; and
 a first safety module that adds the third variable to a safety list, if the third variable is not within the range.

26. A system according to claim 25, further comprising:
 a second safety module that adds an end address of a range of addresses being analyzed to the safety list.

27. A system according to claim 26, further comprising:
 a first breakpoint module that sets a breakpoint at a fourth variable equal to a user's choice from the function list.

28. A system according to claim 27, further comprising:
 a second breakpoint module that sets breakpoints at each address contained in the safety list.

29. A system according to claim 28, further comprising:

a debug module that debugs the function chosen by the user.

30. A system according to claim 29, further comprising:

a remove module that removes all breakpoints.

31. A system according to claim 24 wherein:

the second address module traverses at least one thunk.

32. A system according to claim 23 wherein:

the first address module traverses at least one thunk.

* * * * *